United States Patent [19]
Clinton

[11] 3,917,995
[45] Nov. 4, 1975

[54] MOVABLE BRUSH ASSEMBLY FOR MAKING ELECTRICAL CONTACT WITH THE OUTER SURFACE OF AN ELECTRICAL CABLE

[76] Inventor: Henry H. Clinton, R.F.D. No. 1, Ivoryton, Conn. 06442

[22] Filed: Aug. 26, 1974

[21] Appl. No.: 500,456

[52] U.S. Cl. .............................................. 324/54
[51] Int. Cl.² ...................................... G01R 31/12
[58] Field of Search ............ 324/54, 37, 34 TK, 10, 324/51

[56] References Cited
UNITED STATES PATENTS

| | | | |
|---|---|---|---|
| 2,317,720 | 4/1943 | Barnes et al. | 324/37 |
| 2,665,333 | 1/1954 | Dunipace et al. | 324/34 TK |
| 2,978,636 | 4/1961 | Fountain | 324/54 |
| 3,042,861 | 7/1962 | Brys | 324/54 X |
| 3,132,298 | 5/1964 | Doll et al. | 324/10 |
| 3,265,966 | 8/1966 | Cathelin et al. | 324/54 |
| 3,373,358 | 3/1968 | Wagner | 324/51 X |

*Primary Examiner*—Gerard R. Strecker

[57] ABSTRACT

A contact apparatus for making electrical contact with the outer layer of insulation on an electrical cable employs a brush assembly mounted on a pantograph linkage to maintain a substantially fixed angular relationship between the brush assembly and the cable as the cable moves relative to the brushes and axially of itself. A resilient spring cooperates with the pantograph linkage to urge the brush assembly into contact with the outer surface of the cable. Contact brushes on the assembly are formed by metallic bristles disposed at an angle of approximately 30° to the cable axis to permit substantial portions of the outer surface of the cable to be contacted. Several such apparatuses may be employed in combination to make electrical contact with the entire circumference of the cable and thereby permit a high voltage to be applied to the cable insulation for detecting flaws.

8 Claims, 4 Drawing Figures

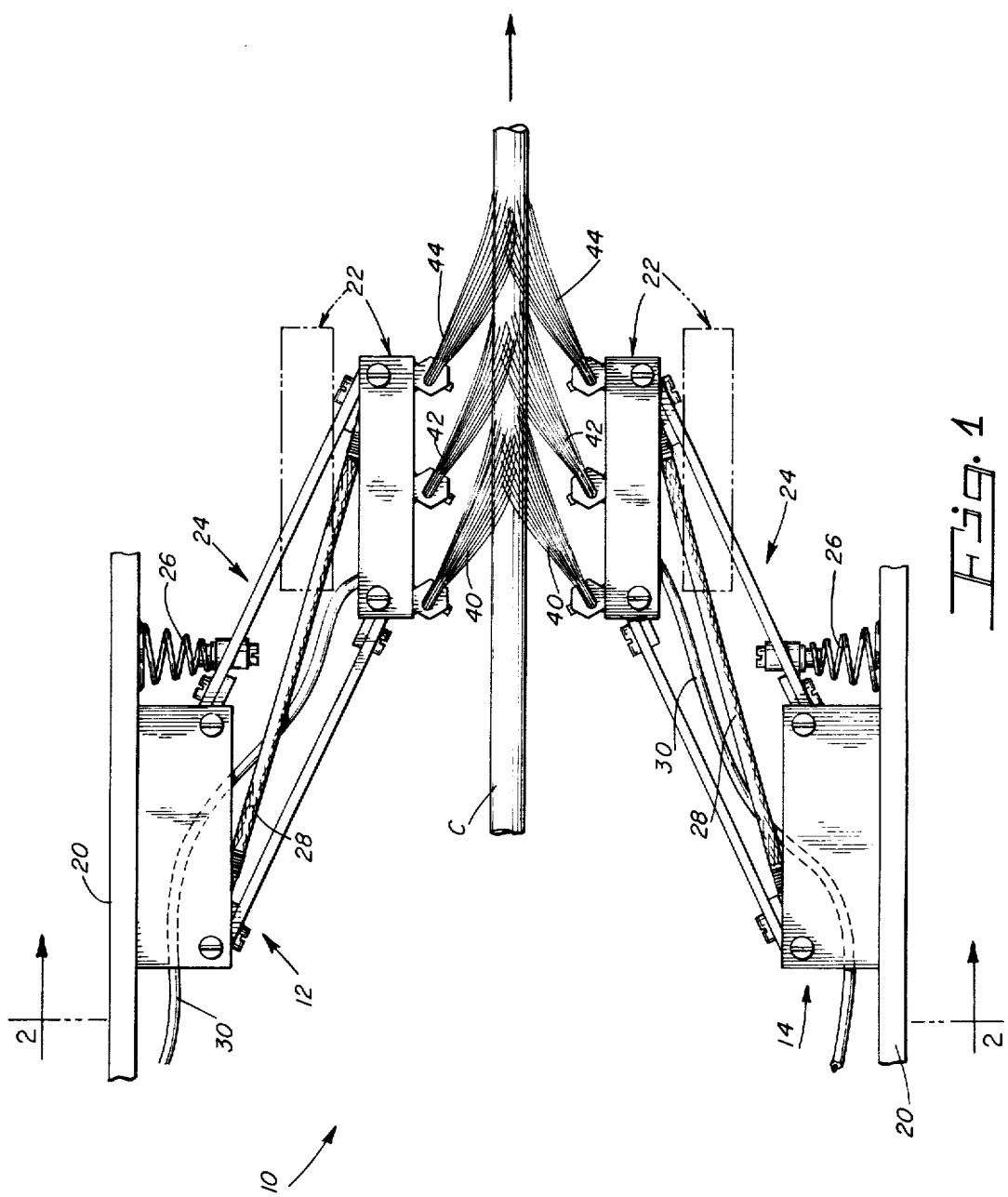

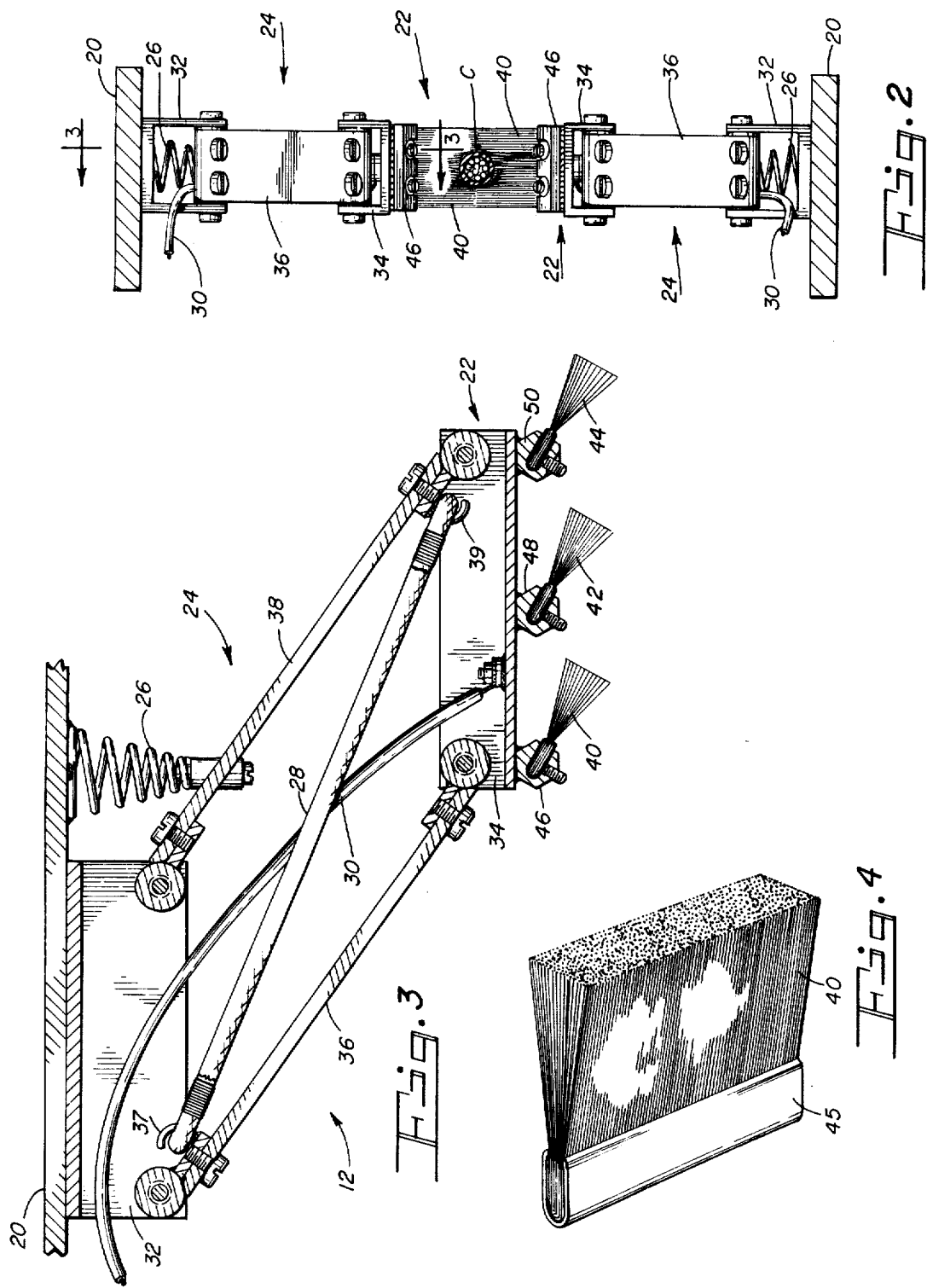

MOVABLE BRUSH ASSEMBLY FOR MAKING ELECTRICAL CONTACT WITH THE OUTER SURFACE OF AN ELECTRICAL CABLE

BACKGROUND OF THE INVENTION

The present invention relates to apparatus for making electrical contact with the outside surface of a cable, especially a cable which moves axially of itself while the electrical contact is maintained. The apparatus is designed in particular to make electrical contact over a large surface area of an insulated cable for the purpose of detecting flaws in the insulation.

The term "electrical contact" as used in this application refers to the physical engagement of an electrified brush and another article that may or may not be electrically conductive.

Insulated electrical wire or cable is commonly manufactured by applying insulation over a moving conductor in a continuous process. During this operation or in subsequent steps holes, cuts, or imperfections may be introduced in the insulation so as to lead to its failure in service. Inasmuch as it is desirable for the manufacturer or the user to detect and eliminate these flaws, many devices have been developed for this purpose. Most of the devices apply a high potential between the cable conductor and a test electrode located near the outer circumference of the insulation under test as the cable moves axially through the device. If a defect in the insulation of the moving cable passes near the electrode, an arc passes between the conductor and the electrode through the defect. The resulting current flow through the electrode from the high potential source is used to sound an alarm or stop the machinery, or perform some other appropriate function.

In the case of high voltage cables, it is considered essential by some to avoid applying a potential significantly higher than the minimum required to arc through an insulation defect. The assumption of those holding this view is that the application of an excessive potential will overstress the insulating material and shorten its service life. Unless the test electrode fits the outer circumference of the insulated cable closely, however, it is necessary to raise the test potential to high levels to permit an arc to travel through the extra air gap introduced by poor electrode fit. Unless the higher value of test potential is used, the risk is taken that an insulation defect will not arc to the electrode and will pass undetected.

Many types of electrodes have been devised for this purpose. The most commonly used type makes use of a forest of metallic bead chains suspended just above the cable which moves horizontally through the chains. This type of electrode fails to make intimate contact with either the top or bottom of the cable due to the inherent shape that the suspended chains assume when draped over the moving cable. Furthermore, air gaps between electrode elements and the cable increase as the cable diameter increases.

More recently, wire brushes have been used as electrodes to greatly reduce these air gaps and increase detection reliability at reduced test potential. Each brush is independently urged against the cable surface by a spring force so that the brush bristles conform to the cable surface, and so that each brush follows any lateral motion of the cable. Electrode length, however, is limited to the thickness of the brush, or approximately one inch (2.5 cm). Since many specifications for wire and cable products require that each spot on the insulation dwell within the electrode for a given period of time, limited brush width places a limiting value on the speed with which the cable may be drawn through the electrode.

Accordingly, an object of the present invention is to provide an improved means for disposing wire electrode brushes around a cable circumference to permit faster cable travel, testing cables having a larger range of diameters, and greater immunity to damage from large lumps or irregularities in the cable.

SUMMARY OF THE INVENTION

The present invention resides in an apparatus for making electrical contact with the outer surface or circumference of an electrical cable as the cable is moved axially of itself relative to the apparatus.

The apparatus comprises a brush assembly forming an electrode and having an electrically conductive contact brush which is brought into physical engagement with the outer surface of the cable to, for example, apply a high potential to the outer layer of insulation and thereby test for defects in the insulation.

A moveable, mechanical support holds the brush assembly for movement toward and away from physical engagement with the cable and at the same time maintains a substantially fixed angular relationship of the brush assembly and the cable. The mechanical support in a preferred embodiment of the invention is formed by a pantograph linkage which has one link anchored to a frame through which the cable moves and a parallel link to which the brush assembly attaches. The remaining parallel links may be constructed of an insulating material to provide isolation between the brush assembly and the frame.

Resilient means is connected with the mechanical support and the brush assembly and urges the contact brush toward physical contact with the outer surface of the cable. Typically, the resilient means is a spring interposed between the mechanical support and the frame through which the cable travels.

When a plurality of metallic bristle brushes comprise the brush assembly, the bristles spread over a large surface area of the moving cable and are maintained at substantially the same angular relationship to the cable by the mechanical support even in the presence of slight lateral shifting of the moving cable or unevenness in the insulation. With a plurality of the brush assemblies and mechanical supports located at different angular positions about the cable, the entire surface of an insulating layer can be exposed to high potential applied to the brushes so that flaws anywhere in the outer layer of insulation will produce detectible currents between the brushes and the central conductor of the cable.

BRIEF DESCRIPTION OF THE DRAWINGS

FIG. 1 is a horizontal elevation view of an insulation tester showing the cable being tested and two electrical contact apparatuses of the present invention.

FIG. 2 is an end view of the tester as viewed along the line 2—2 in FIG. 1.

FIG. 3 is an enlarged sectional view showing details of one electrical contact apparatus on the sectioning line 3—3 of FIG. 2.

FIG. 4 is a perspective view of one metal wire contact brush.

DESCRIPTION OF THE PREFERRED EMBODIMENTS

FIGS. 1 and 2 illustrate a cable insulation tester, generally designated 10, through which an insulated cable C moves axially of itself as indicated by the arrow while flaws in the insulation are detected. The tester 10 includes two electrical contact apparatuses 12 and 14 of similar construction. The apparatuses 12 and 14 are mounted on a frame 20 of the tester and are disposed at two different angularly spaced positions about the cable so that the entire surface of the cable is exposed to a high electrode potential. The inner conductor (not shown) of the cable C is grounded whereby defects in the insulation allow current to pass from the contact brushes or electrodes of the apparatus into the cable, and such currents are detected by suitable monitoring equipment to sound an alarm, stop the cable feed mechanism or perform some other appropriate function that will allow the defect in the insulation to be located and to be either removed or repaired.

The insulated cable C is moved axially through the tester 10 by a feed mechanism such as a pair of spools located at opposite sides of the tester so that the cable passes between the apparatuses 12 and 14. Cable speeds ranging between 600 feet per minute for large cables to several thousand feet per minute for small cables allow great lengths of cable to be tested for flaws in the insulation in relatively brief periods of time.

In the illustrated tester 10, the cable moves in a horizontal plane and the contact apparatuses 12 and 14 are disposed above and below the cable. It will be readily apparent, however, that the cable C can move in a vertical plane or any plane between vertical and horizontal and the apparatuses 12 and 14 will perform their intended function without difficulty.

The apparatuses 12 and 14 have the same construction and, therefore, corresponding parts of each bear the same reference numerals. For convenience, only the apparatus 12 positioned above the cable C will be described in detail unless the collective operations of the apparatuses are involved.

The apparatus 12 is comprised of a brush assembly 22 forming an electrode and a pantograph linkage 24 which serves as a movable mechanical support holding the brush assembly for movement toward and away from physical engagement with the cable. A coil spring 26 and an elastic cord 28 serve as resilient members for biasing the movement of the pantograph linkage and moving the brush assembly into the contact position shown, and away from a non-contact position represented in phantom. An electrical conductor 30 leads from a source of high voltage (not shown) directly to the brush assembly in order to apply a high voltage to the outer layer of insulation on the cable C.

The apparatus 12 is illustrated and described in greater detail in connection with FIG. 3. The pantograph linkage 24 is a four-bar linkage comprised of two pairs of pivotally connected, parallel links or bars. One of the pairs of parallel links is formed by U-shaped channel bars 32 and 34 and the other pair of parallel links is formed by two insulating links 36 and 38. The bar 32 is secured fixedly to the frame 20 and is pivotally connected at its opposite ends to the links 36 and 38 respectively. The bar 34 has its opposite ends pivotally connected to the links 36 and 38 and, since the lengths of the bars 32 and 34 are equal and since the lengths of the links 36 and 38 are equal, the angular relationship of the bar 34 will not change relative to the frame 20 as the insulating links 36 and 38 swing on their pivots. Correspondingly, the angular relationship between the cable C and the bar 34 will not change significantly since suitable openings or other means are provided to guide the cable generally along the axial path through the frame 20 of the tester 10 shown in FIG. 1.

In a preferred embodiment of the apparatus, the bar 34 is made from an electrically conductive material such as aluminum or steel and, for convenience, the bar 32 may be identically formed. The links 36 and 38 are made from an electrically non-conductive material such as a hard acrylic plastic or a fiber composite. In addition, the elastic cord 28 extends between the hooks 37 and 39 mounted respectively at diagonally opposite pivots of the pantograph linkage 24. Since the elastic cord 28 is formed from a resilient material such as natural or synthetic rubber, and since the links 36 and 38 are also made of an electrically nonconductive material, the bars 32 and 34 are electrically insulated from one another. This preferred construction permits an electrical conductor 30 to be attached directly to the bar 34 to apply a high potential to the brush assembly 22 without providing any further electrical insulation between the bar 34 and the frame 20 supporting the apparatus 12.

The brush assembly 22 comprises a plurality of metal-bristle contact brushes 40, 42 and 44 and the bar 34 of the pantograph linkage 24 to which each of the bristles is attached. The brushes 42 and 44 have the same construction as the brush 40 shown in detail in FIG. 4. The metal bristles have free ends which physically engage the outer surface of the cable being tested, and the opposite ends of the bristles are clamped tightly together in a metal ferrule or clamp 45 which is held in a slot of the hexagonal brush mount 46, 48 or 50 by a set screw or other means. The mounts are electrically conductive also and are welded to the lower surface of the bar 34 in parallel relationship at evenly spaced intervals along a line parallel to the path followed by the cable C through the tester 10. With such construction, the brushes 40, 42 and 44 extend toward the cable generally at a 30° angle and make contact with substantially equal surface areas respectively of the insulation being tested. An angular relationship of the brushes and cable less than 90° is desirable for several reasons. The surface covered by an angled brush is larger because contact is made along the sides of the bristles rather than the ends of the bristles. Also, the bristles can lay against the top of the cable and the rounded sides of the cable at the same time. Therefore, up to one half of the cable circumference can be covered and tested with a single brush as shown, for example, in FIG. 2.

In operation, the coil spring 26 and the cord 28 urge the pantograph linkage 24 to pivot downwardly until the brushes 40, 42 and 44 of the brush assembly 22 are brought into physical engagement with a cable to be tested. An electrical power source providing high potential electrical energy of any suitable type, AC, DC, high-frequency or impulse energy, is connected to the conductor 30 to electrify the brushes, and the conductor of the cable C is grounded. When the cable moves axially of itself, an ammeter or other suitable meter (not shown) included in the circuit detects currents generated between the power source and the grounded conductor as the brushes pass over a flaw in the layer of insulation on the cable. Any unevenness in the insulation or slight movements of the cable toward or away from the brush assembly 22 are accommodated by the pantograph linkage 24 which allows the brushes to shift up and down without being damaged. At the same time, the pantograph linkage maintains the brushes and cable axis at a substantially fixed angle shown in the present application to be approximately 30°. It will be understood that to best accommodate the up-and-down movements of the brush assembly 22 in response to the cable, the links 36 and 38 of the pantograph linkage supporting the assembly should extend at an angle not greater than 60° to the axis of the cable. As illustrated, the links are approximately 35° to the cable axis when the brushes 40, 42 and 44 are resting on the insulation. With the links so angled, the forces generated by the coil spring 26 and the tether 28 remain substantially constant and the linkage offers little reaction to forces imposed upon the brushes by the cable.

While the invention has been described in a preferred embodiment above, it should be understood that numerous modifications and substitutions can be had without departing from the spirit of the invention. For example, the links 36 and 38 need not be made from an electrically non-conductive material if other means are provided for insulating the brushes from the frame 20. The springs 26 and 28 are redundant to an extent and, therefore, one or the other may be eliminated. It is apparent that only one brush on the assembly 22 is required to make electrical contact with the cable; however, with a plurality of brushes the effective contact area or electrode length of the brush assembly is increased along with the exposure time of any given segment of cable. Since the increased contact area results in greater exposure times, cables can be moved through the tester 10 at higher speeds without violating test specifications imposing a minimum exposure time. It will be recognized too that although two electrical contact apparatuses 12 and 14 permit the entire circumference of some cables to be tested, larger cables may require still additional contact apparatuses disposed at more than two angularly displaced positions about the cable. Furthermore, it is also possible that such additional apparatuses can be located along segments of the cable other than that along which the apparatuses 12 and 14 operate. It has been found that two apparatuses are adequate to test cable diameters up to one inch (2.5 cm) and that two additional apparatuses oriented in a plane 90° to the apparatuses 12 and 14 and located along a different segment of the cable permit testing of cables between 1 inch and 3 inches (7.5 cm). Additional apparatus need not be used solely for testing cables of larger diameter but may be used on cables of smaller diameter simply to increase the effective electrode length and exposure time. Accordingly, the present invention has been described in a preferred embodiment by way of illustration rather than limitation.

I claim:

1. Apparatus for making electrical contact with the outer surface of an electrical cable moved axially of itself comprising:
    a brush assembly having a plurality of electrically conductive contact brushes which are located in serially adjacent relationship along a line parallel with the axis of the cable and which are brought into physical engagement with the outer surface of the cable;
    a movable mechanical support holding the brush assembly for movement toward and away from physical engagement with the cable and maintaining a substantially fixed angular relationship of the brush assembly and the cable, the mechanical support including a pantograph linkage having two parallel links of the same length and a bar pivotally interconnecting the links and supporting the plurality of contact brushes at the fixed angular relationship with the axis of the cable and with substantially equal contact areas with the cable; and
    resilient means connected with the mechanical support and the brush assembly for urging the contact brush assembly toward physical engagement with the outer surface of the cable.

2. Apparatus for making electrical contact as defined in claim 1 wherein:
    the resilient means comprises a spring operating upon one of the links in the mechanical support.

3. Apparatus as defined in claim 1 wherein the two parallel links of the mechanical support are disposed at an angle to the axis of the cable not greater than 60°.

4. Apparatus for making electrical contact in accordance with claim 1 wherein each of the contact brushes is comprised of a plurality of metal bristles, the free ends of the bristles being placed in physical engagement with the cable.

5. Apparatus for making electrical contact as defined in claim 4 wherein the metal bristles of the contact brushes are disposed and held by the mechanical support at an angle to the cable axis less then 90°.

6. Apparatus for making contact as in claim 5 wherein:
    the angle between the metal bristles and the axis of the cable is approximately 30°.

7. Apparatus for making electrical contact as in claim 1 further including an electrical conductor leading to the brush assembly and electrically connected with the brushes of the assembly.

8. Apparatus for making electrical contact with the outer surface of an electrical cable as defined in claim 1 further including another movable mechanical support, associated resilient means and brush assembly having contact brushes disposed at a position about the cable angularly displaced from said first identified mechanical support, resilient means and brush assembly.

* * * * *